United States Patent [19]

Altinger

[11] Patent Number: 5,058,207
[45] Date of Patent: Oct. 22, 1991

[54] VIEWING WINDOW FOR HEAT PROTECTIVE CLOTHING

[76] Inventor: Winfried Altinger, Holderlinstrasse 39, 7530 Pforzheim-8, Fed. Rep. of Germany

[21] Appl. No.: 613,047

[22] Filed: Nov. 15, 1990

[30] Foreign Application Priority Data

Nov. 15, 1989 [DE] Fed. Rep. of Germany ....... 8913474

[51] Int. Cl.[5] ............................ A42B 1/00; A42B 3/18
[52] U.S. Cl. .................................... 2/8; 2/2; 2/2.1 A; 2/5; 2/7; 2/9; 2/202; 2/411; 2/432
[58] Field of Search .............. 2/2, 2.1 A, 5, 7, 8, 2/9, 202, 410, 411, 412, 431, 432

[56] References Cited

U.S. PATENT DOCUMENTS

| | | | |
|---|---|---|---|
| 2,875,447 | 3/1959 | Goldmerstein | 2/7 X |
| 3,700,761 | 10/1972 | O'Driscoll et al. | 351/160 |
| 3,868,727 | 3/1975 | Paschall | 2/8 |
| 4,101,980 | 7/1978 | Stepan et al. | 2/424 X |
| 4,123,392 | 10/1978 | Hall et al. | 100/640 X |
| 4,542,538 | 9/1985 | Moreelti et al. | 2/8 |
| 4,726,074 | 2/1988 | Badit et al. | 2/453 |
| 4,797,956 | 1/1989 | Boyce | 2/431 |
| 4,800,123 | 1/1989 | Boeckeler | 264/1.4 X |
| 4,965,887 | 10/1990 | Paoluccio | 2/9 |
| 4,975,981 | 12/1990 | Ray | 2/173 |

Primary Examiner—Werner H. Schroeder
Assistant Examiner—Jeanette E. Chapman
Attorney, Agent, or Firm—Spensley Horn Jubas & Lubitz

[57] ABSTRACT

A transparent face shield suitable for exposure to high temperatures, which shield is composed of a pane of polycarbonate having an exterior surface and an interior surface and a layer of gold deposited as a coating in the exterior surface by vapor deposition, together with a plastic inner pane and a PTFE foil interposed between the plastic inner pane and the interior surface of the primary pane such that the inner pane lies flat relative to said the interior surface of the primary pane.

5 Claims, 1 Drawing Sheet

U.S. Patent
Oct. 22, 1991
5,058,207
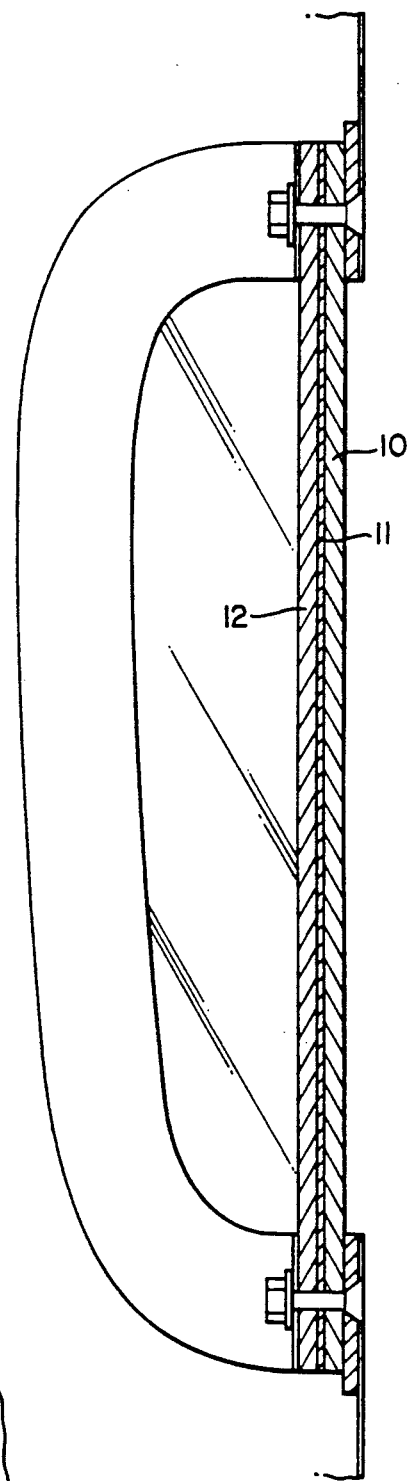
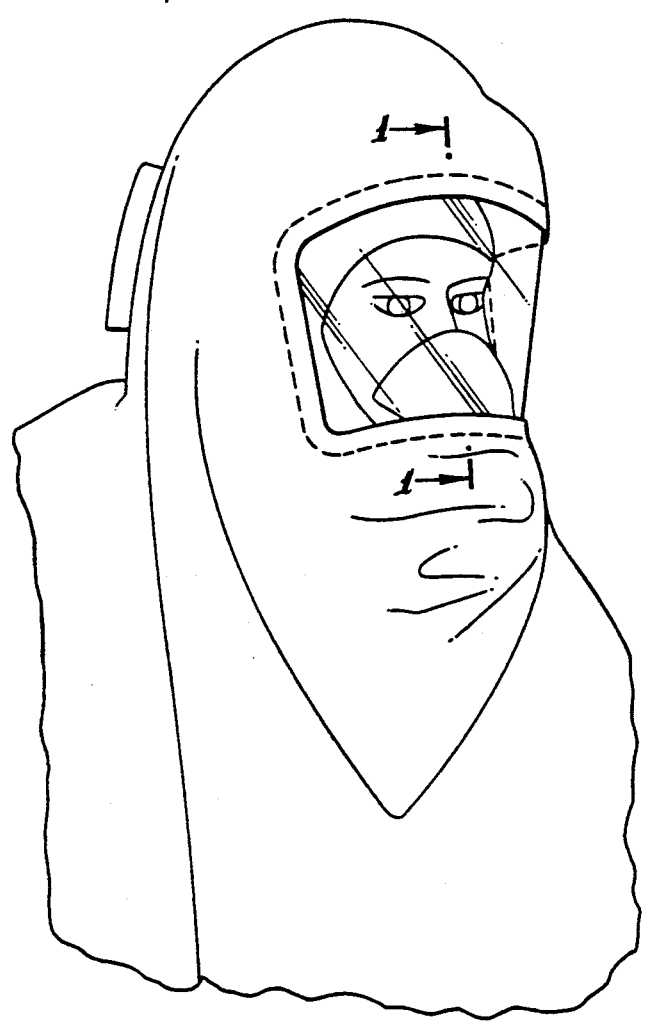

VIEWING WINDOW FOR HEAT PROTECTIVE CLOTHING

BACKGROUND OF THE INVENTION

The present invention relates to a transparent face shield, in particular for heat protection clothing, such as protective suits or protective hoods, with a pane made of polycarbonate coated on the outside with gold by vapor deposition.

In the construction of heat protection clothing the basic problem lies in the provision of face shields which are, on the one hand, fully transparent and, on the other hand, have a high degree of heat resistance.

Glass or plastic can be considered as basic materials for this, each of which has specific advantages and disadvantages: Use of glass, particularly in the form of a laminated glass pane, as a face shield has the advantage of a very high degree of heat resistance However, it is breakable, very heavy and can be provided only in small sizes (approximately 250×150 mm) because of considerable manufacturing restrictions, so that only a restricted field of vision is possible, which impedes use to a considerable extent.

Plastic has been used for a known face shield in the form of a polycarbonate with a gold coating layer deposited on the outside by vapor deposition, where the gold layer serves as a reflecting layer for radiant heat and in this way can reduce the temperature of the polycarbonate behind it.

But since polycarbonate has a comparatively low melting point and since damage to the deposited gold layer continues to occur in practical use, the softening tendency of the shield has made such face shield totally useless.

The advantages of plastic, such as low weight and ease of molding into appropriate shapes thus must be paid for by only limited safety in use, caused by the loss of mechanical stability.

SUMMARY OF THE INVENTION

It is therefore an object of the invention to improve plastic face shields in such a way that the described advantages of manufacture from plastic are maintained, while a considerable improvement of the heat protection effect is achieved.

This object is attained in accordance with the invention in that an inner plastic pane is connected flat with the inside of the main pane via a PTFE foil.

Thus, a multi-layer or sandwich construction is provided in accordance with the invention, where the polycarbonate layer having a gold coating deposited on its outside by vapor deposition is retained, but a further plastic inner pane is used, which is connected with the polycarbonate outer pane by means of a heat-resistant PTFE foil (Teflon TM).

BRIEF DESCRIPTION OF THE DRAWING

FIG. 1 shows the structure of a transparent face shield in accordance with the invention in cross section.

FIG. 2 is a pictorial view of a protective hood of a protective suit, the hood being provided with the face shield of FIG. 1.

DESCRIPTION OF THE PREFERRED EMBODIMENTS

The shield shown in FIG. 1 includes an outer plastic pane 10 made of a polycarbonate with a gold coating deposited on the outside by vapor deposition, an intermediate layer 11 in the form of a PTFE foil and a plastic inner pane 12 made, for example, of cellulose acetate propionate.

Because of its high degree of temperature resistance, PTFE foil 11 performs a heat protective function for the plastic inner pane 12, so that thermal protection is retained to a large extent for the shield, even with possible destruction or functional impairment of polycarbonate outer pane 10, and the mechanical stability of the face shield is also not lost.

Cellulose acetate propionate has shown itself to be particularly advantageous for the plastic inner pane, which is coated on the inside with a hydrophilic material for prevention of fogging of the inner pane.

Thus the face shield in accordance with the invention is fabricated by a sensible and mutually complementary association of different materials which complement each other in their specific protective functions and specific mechanical properties. Tests have shown that such a face shield will easily stand up to an outside temperature (measured at the outer pane) of 300° C. over a period of time of approximately seven minutes, which approximately corresponds to the average radiated temperature of a flame.

If the thicknesses of the layers of the individual sandwich are the following:

polycarbonate pane (10): 1 mm
PTFE foil (11): 0.127 mm
Plastic inner pane (12): 1 mm, the properties of the plastic material in the form of a face shield in regard to transparency, weight savings and heat protection are optimized.

FIG. 2 shows the above-described face shield in the protective hood of a protective suit.

This application relates to subject matter disclosed in Federal Republic of Germany Application Number G 89 13 473.7, filed on Nov. 15, 1989, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a transparent face shield suitable for exposure to high temperatures, which shield is composed of a pane of polycarbonate having an exterior surface and an interior surface and a layer of gold deposited as a coating in the exterior surface by vapor deposition, the improvement wherein said shield further comprises: a plastic inner pane; and a PTFE foil interposed between said plastic inner pane and said interior surface of said polycarbonate.

2. A transparent face shield in accordance with claim 1 wherein said inner pane is made of cellulose acetate propionate.

3. A transparent face shield in accordance with claim 2 further comprising a layer of a hydrophilic material disposed on said inner pane.

4. A transparent face shield in accordance with claim 1 wherein said polycarbonate pane has a thickness of 1 mm, said PTFE foil has a thickness of 0.127 mm and said inner pane has a thickness of 1 mm.

5. A transparent face shield as defined in claim 1 forming the face shield of a protective hood.

* * * * *